May 11, 1954 — S. J. BERMAN — 2,677,976
DUAL CONTROL BRAKE ATTACHMENT FOR AUTOMOBILES
Filed May 3, 1952
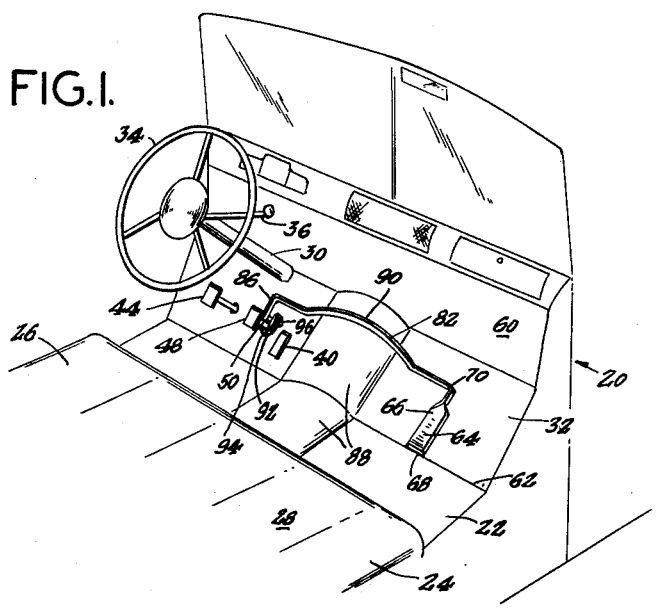
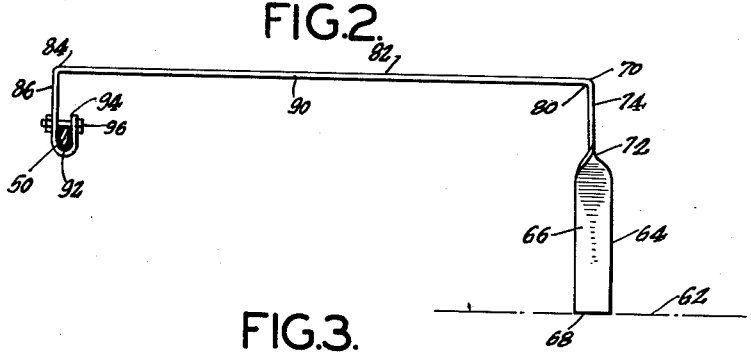
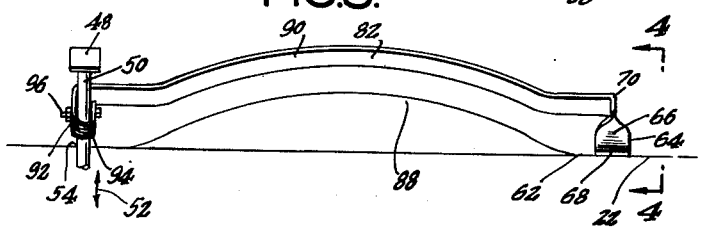
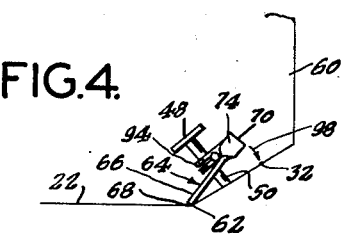
INVENTOR.
SEYMOUR J. BERMAN
BY
ATTORNEY.

Patented May 11, 1954

2,677,976

UNITED STATES PATENT OFFICE 2,677,976

DUAL CONTROL BRAKE ATTACHMENT FOR AUTOMOBILES

Seymour J. Berman, Lynbrook, N. Y.

Application May 3, 1952, Serial No. 285,915

4 Claims. (Cl. 74—562.5)

This invention relates to improvements in auxiliary foot operated devices for controlling the brakes of motor vehicles.

An object of the invention is to provide a novel and improved device for achieving dual control of the foot brakes of a motor vehicle, so that both the driver of the motor vehicle and a person sitting alongside him or her on the front seat of the vehicle, can operate the foot brake to slow down the vehicle or bring it to a stop.

Another object of the invention is to provide a novel and improved device for dual control of the foot brake of a motor vehicle, which is so constructed that it may be installed in any existing type of motor vehicle without structural alteration thereof.

A further object of the invention is to provide a novel and improved device for dual control of the foot brake of a motor vehicle, in which means is provided for engaging the operating shaft of the foot brake of the vehicle and for transferring to the foot brake the foot pressure of a teacher or person other than the driver of the vehicle and seated to one side of the driver, for effectively operating the foot brake when necessary or considered desirable by the other person.

Still another object of the invention is to provide a novel and improved auxiliary appliance for effecting dual foot brake control in a motor vehicle, which is simple in design, inexpensive to manufacture, highly effective in operation, and which may be installed by anyone without the need for tools other than a wrench or pair of pliers.

These and other objects and advantages of the invention will become apparent from the following description of a preferred embodiment thereof as illustrated in the accompanying drawings, forming a part hereof, and in which, Fig. 1 is a fragmentary perspective view showing a portion of a motor vehicle at the driver's seat, with my improved dual control device installed therein;

Fig. 2 is a top plan view of the device seen in Figure 1, apart from the surrounding portions of the motor vehicle;

Fig. 3 is a front elevational view of the device shown in Figures 1 and 2, showing it in engagement with the foot brake pedal; and Fig. 4 is a right end elevational view of the device shown in Figure 3, as might be seen on plane 4—4, of Figure 3.

In connection with the operation of motor vehicles, a number of problems have arisen. One of these is that of dual control of the foot brake so that a person sitting alongside the driver may, if necessary, operate the foot brake so as to either slow down the vehicle or bring it to a halt. Such person may be either a driving instructor sitting alongside a relatively inexperienced pupil, and faced with the need for instantly applying the foot brake in an emergency, or may be merely a passenger or companion who, finding that the driver has suddenly become ill or fainted, must apply the brakes to stop the vehicle. All this is necessary because motor vehicles are normally provided with all the necessary controls, foot brake and the like, convenient to the driver, but out of reach of anyone else.

The present invention provides a simple device which may be attached to existing motor vehicles, to permit dual control of the foot brake thereof. In order to understand clearly the nature of the invention and the best means for carrying it out, reference may now be had to the drawings, in which like numerals denote similar parts throughout the several views.

As shown, there is a motor vehicle generally indicated at 20, with a front floor 22 carrying a platform or frame on which is mounted the front seat 24 upon which the driver sits at the left 26. One or more other persons may sit on the front seat 24, to the right of the driver, as for example in position 28. A steering post 30 extends through the floor board 32, and carries the steering wheel 34, and the gear shift lever 36, which is actuated by the hand of the driver, through suitable mechanical linkages in any well known manner.

An accelerator pedal 40 is also provided, on the floor board 32, for portions of the motor vehicle having to do with speeding up the operation of the motor or for slowing it down as needed. Where an automatic gear shift is provided in the car, there will be no clutch pedal, but where there is manual shifting alone, there will be a clutch pedal 44, for enclutching and declutching the motor from the transmission by means of a clutch plate in any well known manner. To the right of the clutch pedal 44, there is commonly located the foot brake pedal 48, which is mounted on a foot brake shaft 50, for movement generally in the direction of the arrow 52, being spring biased toward its upraised full line position shown in Figure 3.

The foot brake shaft 50 extends through an opening 54 in the floor board 32, and normally engages a pivoted lever below board 32, for actuating the brake of the vehicle. The arrangement is such that the brake is normally disengaged when the pedal 48 is in upraised position, and is engaged when the operator presses downwards on the brake pedal, thus causing the brake shoes on the wheels of the car to grip the brake drums, halting motion thereof.

As shown, the floor 22 intersects with the inclined floor board 32, which in turn intersects with the substantially vertical forward panel wall 60 of the body of the vehicle. As seen in Figure 4, the angle formed between floor 22 and floor board 32 is normally obtuse, the line of intersection being indicated at 62. I provide novel means for actuating the brake pedal 48 by the other occupant sitting on the front seat to the right of the driver, that is, in the position 28.

For this purpose, I provide an auxiliary brake pedal member 64, which is flattened out on its upper surface 66, and has a lower or rearward edge 68 which fits into the angular intersection 62 of the floor 22 and inclined floor board 32, so as to be fulcrumed or pivoted therein. Toward its rearward end portion 70, a twist 72 is taken in the brake pedal member 64, so that its end 74 is substantially at right angles to the plane of the rest of the auxiliary pedal, and is then integrated at the bend corner 80 with the lateral elongated connection bar member 82 of the device.

The connection bar member 82 extends right across the distance intervening between the location of the auxiliary pedal 66 and the regular brake pedal 48, to corner bend location 84, where it intersects integrally with the brake pedal extension rod 86, which in turn is seen to lie in a plane which is substantially parallel to the plane of the auxiliary pedal portion 74, and at right angles to the plane in which connection bar member 82 lies. Where the motor vehicle is formed with a lower center of gravity, necessitating arching the floor and floorboard 22 and 32 respectively, as at 88, an arch or curve 90 may be formed in the intermediate portion of the connection bar member 82, so that there is no interference with the arch 88 and there will be substantial clearance under the connection bar member.

The brake pedal extension rod 86 extends to location 92, and is then bent back upon itself as at flange 94 in a sort of U-shape, forming a yoke to receive the brake pedal shaft 50 therein in the manner of Figures 2 and 3. A bolt 96 is inserted through aligned openings formed in legs 86 and 94 of the U-shaped yoke in the manner of Figure 2, and tightened to draw the legs of the yoke toward each other so as to tightly grip and grasp the brake pedal shaft 50 therebetween for movement of the brake pedal shaft 50 with the yoke legs 86 and 94. Referring now to Figure 4, it is seen that there is normally substantial clearance between the bend corner end 70 of the auxiliary brake pedal 64, and the underlying surface of the floor board 32, when the regular brake pedal 48 is in upraised disengaged position.

Assuming that the motor vehicle is being driven along, and that the pupil or driver sitting in seat 26 fails to stop when an emergency presents itself, the teacher sitting on seat portion 28 has only to press with his foot on the auxiliary brake pedal 66, so as to depress it in the direction of the arrow 98 shown in Figure 4, the lower end edge 68 of the auxiliary brake pedal being pivotally secured and engaged in the angular intersection 62 of the floor 22 and floor board 32. The result is that the depression of the auxiliary brake pedal 64 will cause the corresponding depression of the regular brake pedal 48 in unison therewith, so as to engage the brakes of the vehicle, bringing it to a halt. When in turn the teacher releases his foot pressure on pedal 66, the spring which normally biases the regular brake pedal 48 upwards to disengaged position, will act similarly to disengage the brake, returning pedal 66 to its disengaged normal full line position.

The novel construction, with the pivotal engagement of the lower edge of the auxiliary pedal 66 with the intersection joint 62, makes the auxiliary brake control effective without the need for structural alteration of the vehicle itself at all. It is clear that it can be attached to and used in connection with any vehicle foot brake, for achieving additional safety of operation, especially for inexperienced drivers.

Although I have described my invention in specific terms, it will be understood that variations may be made in size, shape, materials and arrangement without departing from the spirit and scope of the invention.

I claim:

1. A dual braking device adapted for use with the regular brake pedal means of an automobile comprising an auxiliary brake pedal member, the bottom of said auxiliary brake pedal member adapted to rest freely upon the floor board of said automobile and pivot thereabout, a clamp means adapted to embrace said regular brake pedal means, and a rod rigidly connecting said clamp means and said auxiliary brake pedal member, said dual braking device engaging said floor board along the bottom of said auxiliary brake pedal member only, and said dual braking device being attached only to said regular brake pedal means.

2. A dual braking device adapted for use with the regular brake pedal means of an automobile comprising an auxiliary brake pedal member, the bottom of said auxiliary brake pedal member adapted to rest freely upon and unattached to the floor board of said automobile, a clamp means adapted to embrace said regular brake pedal means, and a rod rigidly connecting said clamp means and said auxiliary brake pedal member, said dual braking device engaging said floor board along the bottom of said auxiliary brake pedal member only, and said auxiliary brake pedal member adapted for pivotal movement about its place of engagement with said floor board.

3. A dual braking device adapted for use with the regular brake pedal means of an automobile comprising an auxiliary brake pedal member, the bottom of said auxiliary brake pedal member adapted to rest freely upon and unattached to the floor board of said automobile, a clamp means adapted to embrace said regular brake pedal means, and a rod rigidly connecting said clamp means and said auxiliary brake pedal member, said dual braking device engaging said floor board along the bottom of said auxiliary brake pedal member only, and said auxiliary brake pedal member adapted for pivotal movement about its place of engagement with said floor board, said regular brake pedal means having a shaft carrying the same for movement therewith, said clamp means having a pair of legs bent to form a U-shaped yoke defining a hollow area to receive said shaft, and tie bolt means arranged to draw said legs toward each other to grip said shaft firmly for movement therewith.

4. A dual braking device adapted for use with the regular brake pedal means of an automobile comprising an auxiliary brake pedal member, the bottom of said auxilary brake pedal member adapted to rest freely upon and unattached to the floor board of said automobile, a clamp means adapted to embrace said regular brake pedal means, and a rod rigidly connecting said clamp means and said auxiliary brake pedal member, said dual braking device engaging said floor board along the bottom of said auxiliary brake pedal member only, and said auxiliary brake pedal member adapted for pivotal movement about its place of engagement with said floor board so that movement of said auxiliary brake pedal member will cause corresponding movement of said regular brake pedal means, said dual braking device being attached to said regular brake pedal means only.

References Cited in the file of this patent

UNITED STATES PATENTS

| Number | Name | Date |
| --- | --- | --- |
| 1,580,384 | Schleich | Apr. 13, 1926 |
| 2,395,280 | Law | Feb. 19, 1946 |
| 2,430,561 | Fletcher | Nov. 11, 1947 |
| 2,524,486 | Snow | Oct. 3, 1950 |
| 2,562,700 | Curtenius | July 31, 1951 |
| 2,599,376 | Ehrenberg | June 3, 1952 |